US006829776B2

United States Patent
Chen et al.

(10) Patent No.: US 6,829,776 B2
(45) Date of Patent: Dec. 7, 2004

(54) ENGAGING HEAD FOR MOVEMENT CONVERTING MECHANISM IN OPTICAL DISC DRIVE

(75) Inventors: Eric Chen, Taipei (TW); Gary Huang, Taoyuan (TW)

(73) Assignee: Accesstek Inc., Taipei (TW)

( * ) Notice: Subject to any disclaimer, the term of this patent is extended or adjusted under 35 U.S.C. 154(b) by 0 days.

(21) Appl. No.: 10/248,522

(22) Filed: Jan. 27, 2003

(65) Prior Publication Data

US 2004/0109403 A1 Jun. 10, 2004

(30) Foreign Application Priority Data

Dec. 9, 2002 (TW) ...................................... 91219886 U

(51) Int. Cl.[7] ........................... G11B 7/08; G11B 7/085; G11B 7/09; G11B 17/30; G11B 21/02
(52) U.S. Cl. ...................................... 720/663; 369/223
(58) Field of Search ................................ 720/663, 658, 720/659; 369/223, 219, 215, 176

(56) References Cited

U.S. PATENT DOCUMENTS 5,535,076 A  *  7/1996  Kamioka et al. ........ 360/267.4
6,700,859 B2  *  3/2004  Oono et al. .................. 369/223
6,724,714 B1  *  4/2004  Kato et al. ................ 369/219.1
2003/0235139 A1  *  12/2003  Takeuchi ..................... 369/223

FOREIGN PATENT DOCUMENTS

GB          2217094 A  *  10/1989

* cited by examiner

Primary Examiner—Julie Anne Watko
(74) Attorney, Agent, or Firm—Jiang Chyun IP Office

(57) ABSTRACT

An engaging head implemented in a movement converting mechanism to engage with a screwed rod comprises an attachment body, a gear part, and a resilient pre-loading element. The attachment body has a pushing sidewall. The gear part has an inner surface facing the pushing sidewall of the attachment body, and an opposite outer surface provided with gear teeth. The resilient pre-loading element is mounted between the pushing sidewall of the attachment body and the inner surface, and has a side abutting against the pushing sidewall and another side abutting against the inner surface of the gear part. Being compressed between the pushing sidewall and the inner surface, the resilient pre-loading element thereby exerts a pre-loaded engagement pressure that results in a deflection of the gear part to ensure an adequate engagement of the gear teeth with the screwed rod.

12 Claims, 6 Drawing Sheets

ENGAGING HEAD FOR MOVEMENT CONVERTING MECHANISM IN OPTICAL DISC DRIVE

CROSS REFERENCE TO RELATED APPLICATIONS

This application claims the priority benefit of Taiwan application serial no. 91219886, filed Dec. 9, 2002.

BACKGROUND OF INVENTION

1. Field of the Invention

The invention relates generally to a movement converting mechanism involving a screwed rod and a gear part. More particularly, the invention provides a engaging head implemented in a movement converting mechanism to engage with a screwed rod.

2. Description of the Related Art

The use of a gear element engaging with a rotating screwed rod is well known in the art to produce convert a rotating movement to a translation movement. By further coupling the screwed rod with a step motor, the rotation angle of the screwed rod is accurately controlled, and an accurate translation and positioning of the moving unit to which is assembled the gear element is obtained. Therefore, this type of construction is common in movement mechanisms that require a highly accurate driving and positioning of the moving unit.

The disc reading/writing head of an optical disc drive is driven in motion by means of a similar mechanism as described above to read data on an optical disc. Conventionally, a wedge-shaped engaging head is fixedly attached to the disc reading/writing head. The engaging head has a gear part that engages with a screwed rod to drive the disc reading/writing head in translation. The construction of the engagement between the screwed rod and the engaging head is critical in order to obtain a highly accurate driving of the disc reading/writing head.

Conventionally, it is necessary to pre-load an engagement pressure in the engaging head so that when this latter is mounted and placed in a manner to mesh with the screwed rod, an adequate engagement pressure is produced between the screwed rod and the engaging head. This engagement pressure directly affects the accuracy of the movement converting mechanism: if the engagement pressure is too high, an excessive resistance hampers an effective driving from the step motor; if the engagement pressure is too small, a backlash may occur, which results in a driving error.

FIG. 1 is a schematic view illustrating an engaging head for a disc reading/writing head known in the art. As illustrated, the known engaging head comprises a main body 100 from which projects a supporting extension 106. A gear part 104 is connected to the supporting extension 106 via a connecting portion 102. The connecting portion 102 is relatively thinner, which creates a certain flexibility that enables a deflection of the gear part 104 relative to the main body 100 to engage with the screwed rod. To pre-load an engagement pressure in the engaging head, a spring 108 has an end fixedly attached to the main body 100, and an opposite end abutted against an inner surface of the gear part 104.

To obtain pre-load a desired engagement pressure, the inclination of the spring 108 and its contact point with the inner surface of the gear part 104 have to be controlled, and the positioning of the spring 108 further has to be accurately controlled. This construction is not satisfactory because it results in an inconstant yield.

SUMMARY OF INVENTION

An aspect of the invention is therefore to provide an engaging head that, implemented in a movement converting mechanism to engage with a screwed rod, and more particularly in a movement converting mechanism for an optical disc drive, allows an effective control of the pre-loaded engagement pressure with the screwed rod.

Another aspect of the invention is to provide an engaging head used in a movement converting mechanism that provides a good yield.

Furthermore, another aspect of the invention is to provide an engaging head that simplifies the construction of the movement converting mechanism.

To accomplish the above and other objectives, an engaging head of the invention, implemented in a movement converting mechanism to engage with a screwed rod, comprises an attachment body, a gear part, and a resilient pre-loading element. The attachment body has a pushing sidewall. The gear part has an inner surface facing the pushing sidewall of the attachment body, and an opposite outer surface provided with gear teeth. The resilient pre-loading element is made of specifically adequate materials that are, according to the invention, silicon sponges, rubber, plastics, or foam sponges. The resilient pre-loading element is mounted between the pushing sidewall of the attachment body and the inner surface, and has a side abutting against the pushing sidewall and another side abutting against the inner surface of the gear part. Being compressed between the pushing sidewall and the inner surface, the resilient pre-loading element thereby exerts a pre-loaded engagement pressure that results in a deflection of the gear part to ensure an adequate engagement of the gear teeth with the screwed rod.

According to an embodiment of the invention, the resilient pre-loading element is directly attached to the pushing sidewall of the attachment body and the inner surface of the gear part.

According to a variant embodiment of the invention, the gear part is further connected to the pushing sidewall of the attachment body via a supporting extension that projects from the pushing sidewall of the attachment body. A connecting portion connects the gear part to the supporting extension, and is sufficiently flexible to allow a deflection of the gear part. The pushing sidewall of the attachment body, the supporting extension, and the inner surface of the gear part thereby define an accommodating space in which is mounted the resilient pre-loading element by insertion. Optionally, the supporting extension further sideways forms two reinforcement flanks, and a cover projects from the pushing sidewall of the attachment body over the accommodating space to confine the resilient pre-loading element therein.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
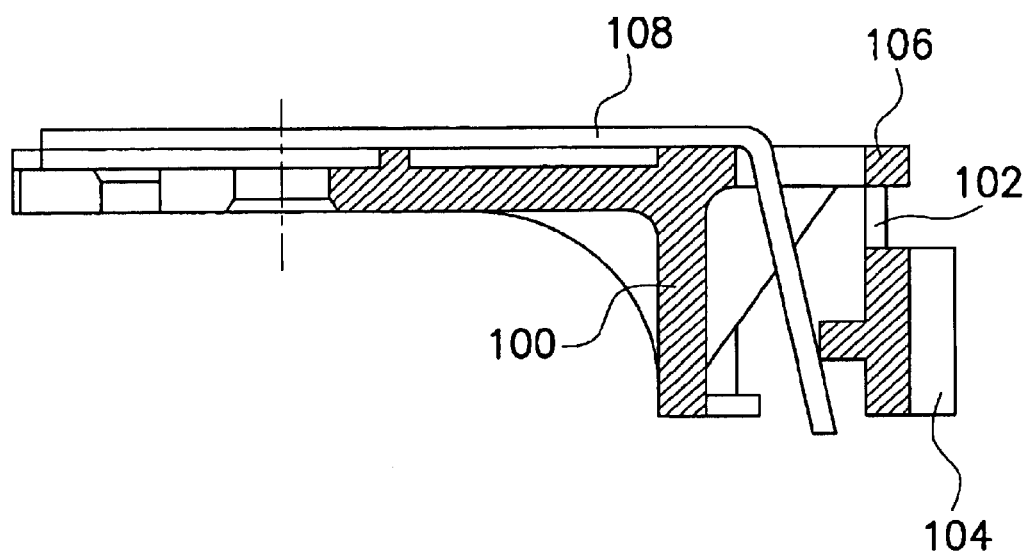
FIG. 1 is a schematic view of a conventional engaging head used in a movement converting mechanism to engage with a screwed rod.

The following detailed description of the embodiments and examples of the present invention with reference to the accompanying drawings is only illustrative and not limiting. Furthermore, wherever possible in the description, the same reference symbols will refer to similar elements and parts unless otherwise illustrated in the drawings.

Reference now is made to FIG. 2 through FIG. 5 to describe an engaging head for a movement converting mechanism according to an embodiment of the invention. A major aspect of the invention is to provide an engaging head that is implemented, according to the illustrated embodiment, in a movement converting mechanism of an optical disc drive.

The engaging head is generally wedge-shaped, and comprises an attachment body 200 that is provided with at least a screwed hole 220 by means of which the engaging head is fixedly attached to a moving unit (typically a disc reading/writing head as detailed hereafter). A gear part 206 is connected to the attachment body 200 via a supporting extension 202 that projects approximately perpendicular from a pushing sidewall 216 of the attachment body 200. The gear part 206 connect approximately perpendicular to the supporting extension 202 via a connecting portion 204 (in other words, the gear part 206 lies approximately parallel to the pushing sidewall 216). The connecting portion 204 is such that it allows a deflection of the gear part 206. This may be achieved via, for example, forming the attachment body 200, the supporting extension 202, the connecting portion 204 and the gear part 206 in a single body with the connecting portion 204 sufficiently thin and flexible to allow a deflection of the gear part 206. The deviation angle of the gear part 206 relative to the supporting extension 202 is thereby adjustable as detailed hereafter.

The gear part 206 includes an inner surface 210 and an opposite outer surface 208, being respectively provided with an abutment protrusion 212 and gear teeth 214. The gear teeth 214 on the outer surface 208 mesh with a screwed rod to drive the moving unit in motion, as detailed hereafter. The inner surface 210 of the gear part 206, the pushing sidewall 216 of the attachment body 200, and the supporting extension 202 define an accommodating space 215 in which erects the abutment protrusion 212.

A resilient pre-loading element 218 is placed in the accommodating space 215 in a manner to respectively abut the pushing sidewall 216 of the attachment body 200 and the abutment protrusion 212. Before being placed in the accommodating space 215, the pre-loading element 218 has a thickness greater than the correspondingly receiving gap between the abutment protrusion 212 and the pushing sidewall 216. When it is placed in position in the accommodating space 215, the pre-loading element 218 is compressed between the pushing sidewall 216 and the abutment protrusion 212 in a manner to produce a resilient force that presses on and deflects the gear part 206. The thickness and the elasticity of the pre-loading element 218 are therefore adequately set to obtain a desired deflection of the gear part 206 and, consequently, a pre-loaded engagement pressure of the gear teeth 214 that corresponds to the resilient force exerted by the pre-loading element 218. Resilient materials such as silicon sponge, rubber, plastics, or foam sponges are suitable to accurately obtain a desired resilient force of the pre-loading element 218 when this latter is compressed. Further having damping characteristics, these materials of the pre-loading element 218 further are capable of absorbing vibrations that may occur when the gear part 206 engages with the screwed rod and the moving unit (such as a disc reading/writing head) is driven in motion.

Figure 2:
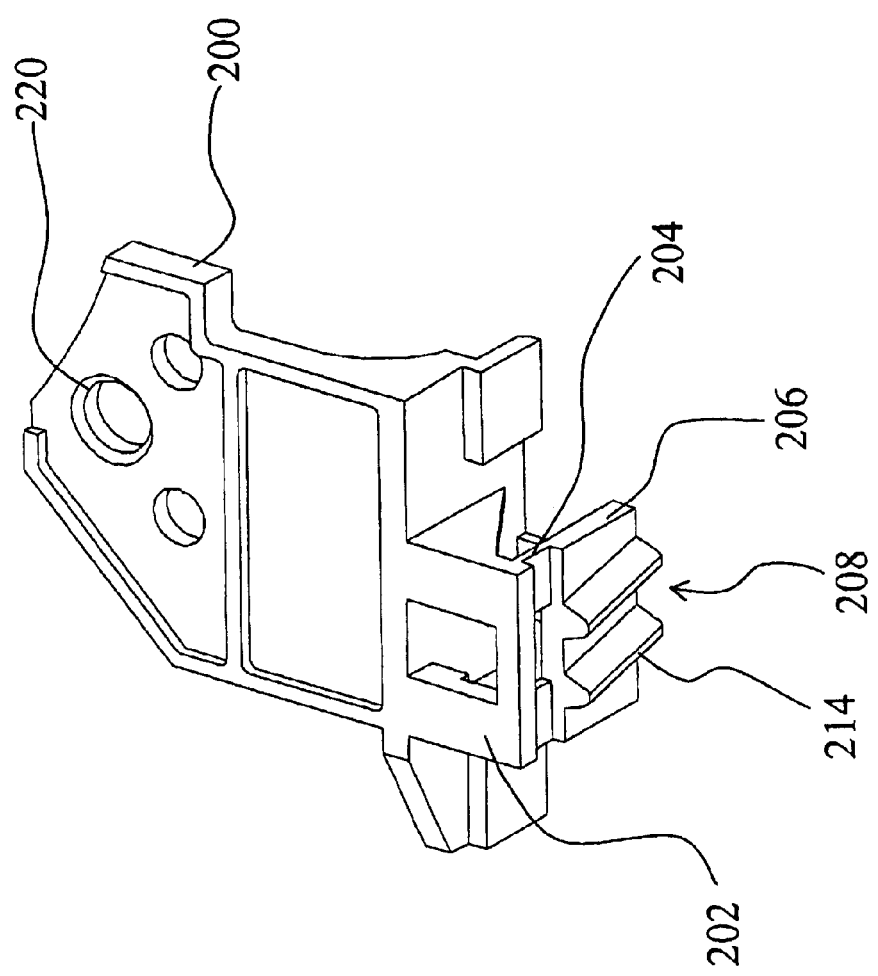
FIG. 2 is a perspective view illustrating the structure of an engaging head used in a movement converting mechanism to engage with a screwed rod according to an embodiment of the invention.
Figure 3:
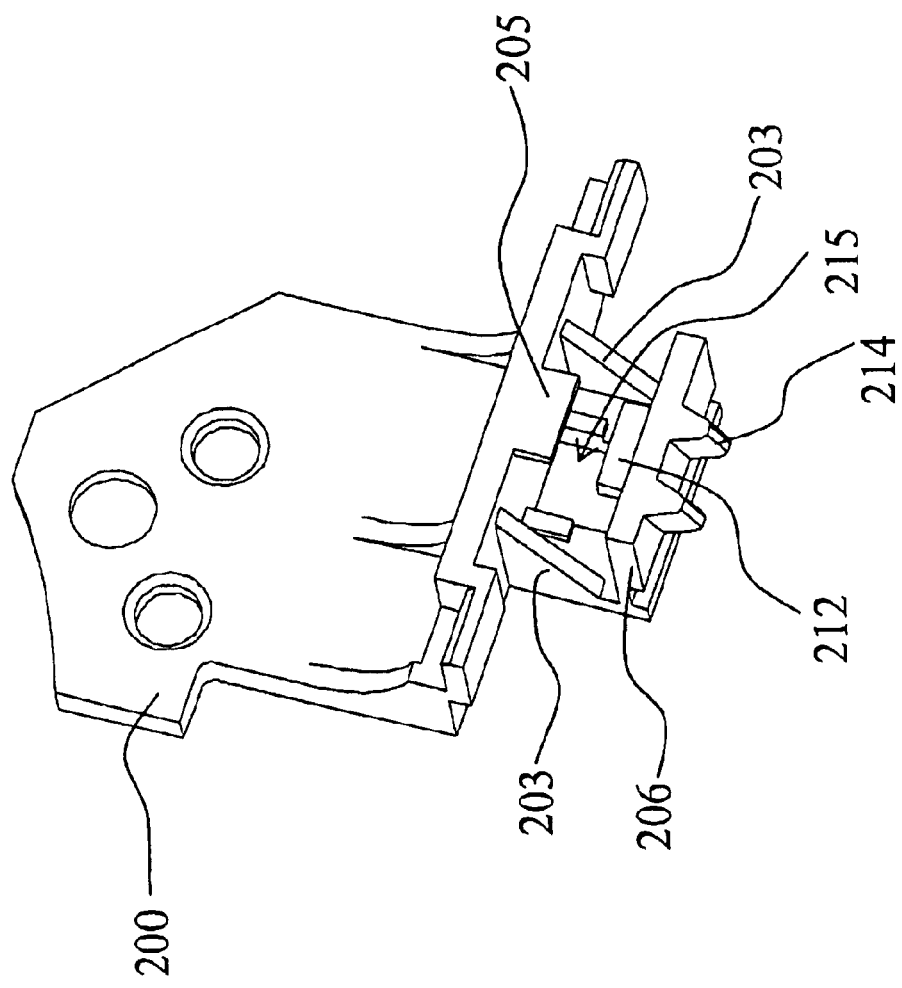
FIG. 3 is a perspective view illustrating the engaging head of FIG. 2 under another angle of view.
Figure 4:
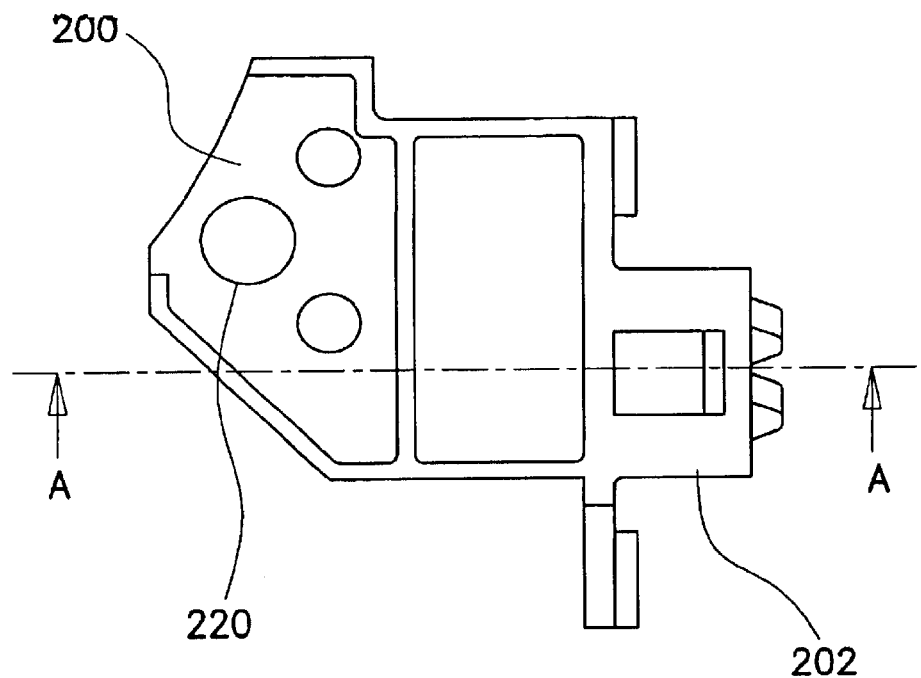
FIG. 4 is a top view of the engaging head of FIG. 2.
Figure 5:
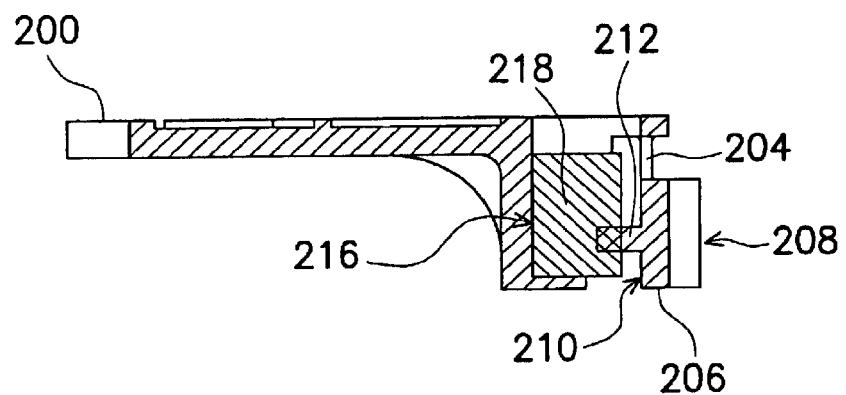
FIG. 5 is a cross-sectional view of FIG. 4 taken along the section A—A, including the resilient pre-loading element.

As illustrated in FIG. 2 and FIG. 3, two sides of the supporting extension 202 (shown in FIG. 2) further may respectively form reinforcement flanks 203 that connect with the pushing sidewall 216 of the attachment body 200. The reinforcement flanks 203 restrict the position of the pre-loading element 218 inside the accommodating space 215 and reinforce the rigidity of the supporting extension 202. A cover 205 may further project from the pushing sidewall 216 (shown in FIG. 5) of the attachment body 200 over the accommodating space 215 and approximately vis-à-vis the supporting extension 202 in order to prevent the pre-loading element 218 from leaving the accommodating space 215.

It should be noticed that the reinforcement flanks 203 and the cover 205 are optional, and their number is not limited to the above description. The compression exerted between the pushing sidewall 216 and the abutment protrusion 212 may be sufficient to clamp the pre-loading element 218 without the need of the above limiting elements.

Figure 6:
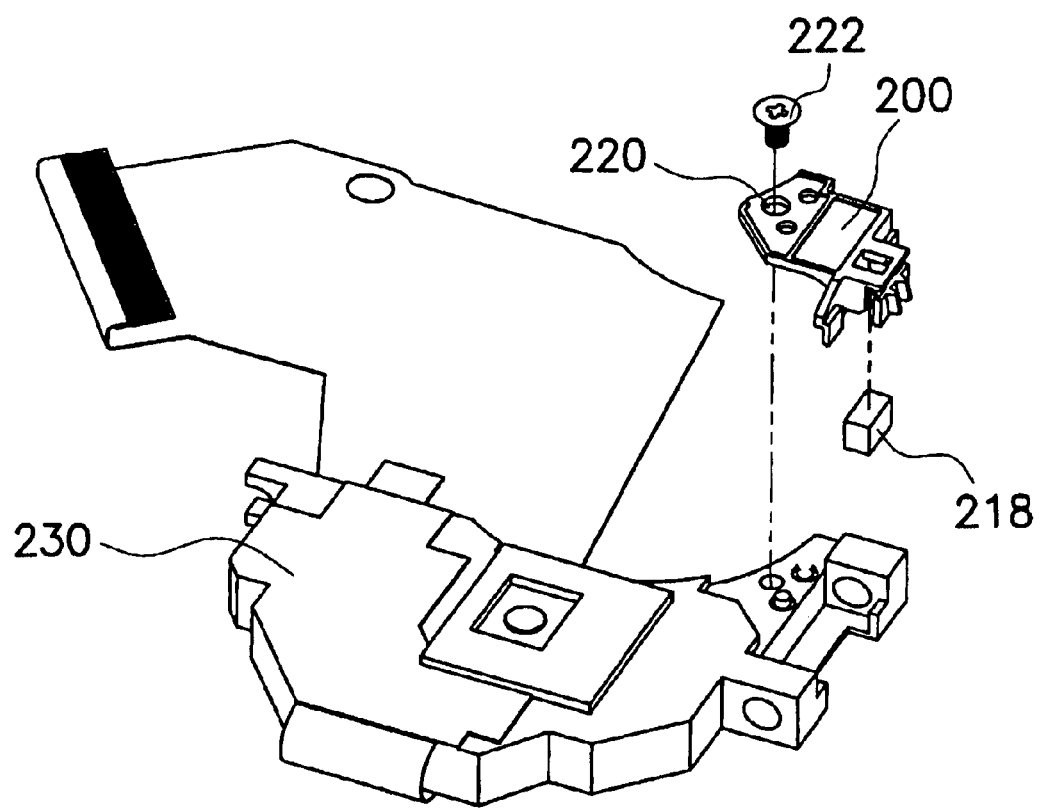
FIG. 6 is a perspective view illustrating the assembly of the engaging head with a disc reading/writing head according to an embodiment of the invention.
Figure 7:
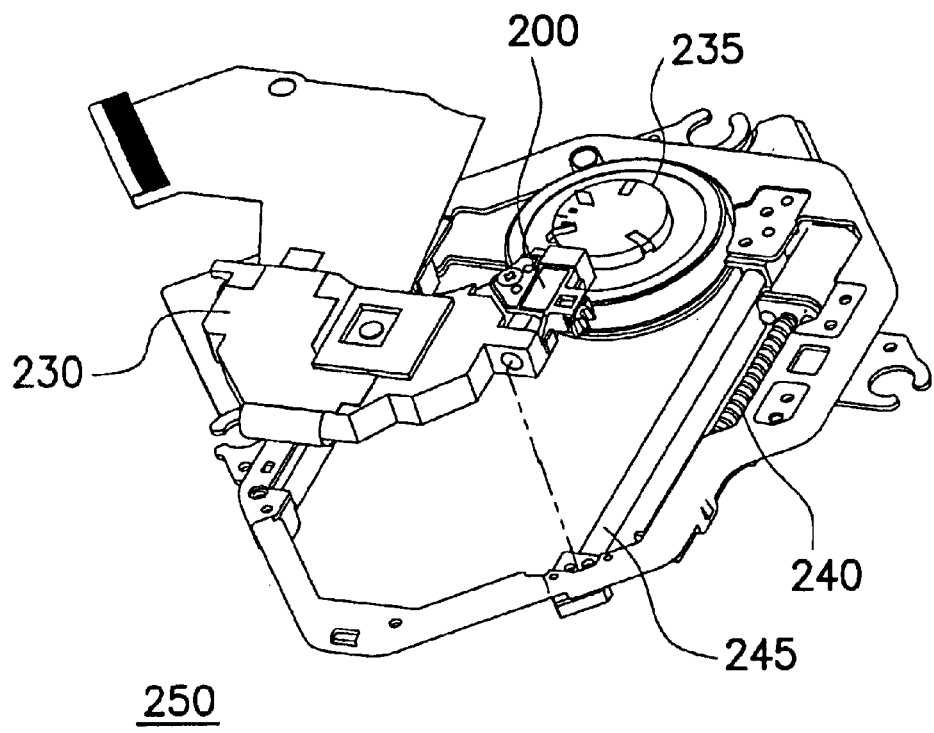
FIG. 7 and FIG. 8 are perspective views illustrating the assembly of the disc reading/writing head, mounted with the engaging head, in an optical disc drive in a manner to engage with the screwed rod according to an embodiment of the invention.
Figure 8:
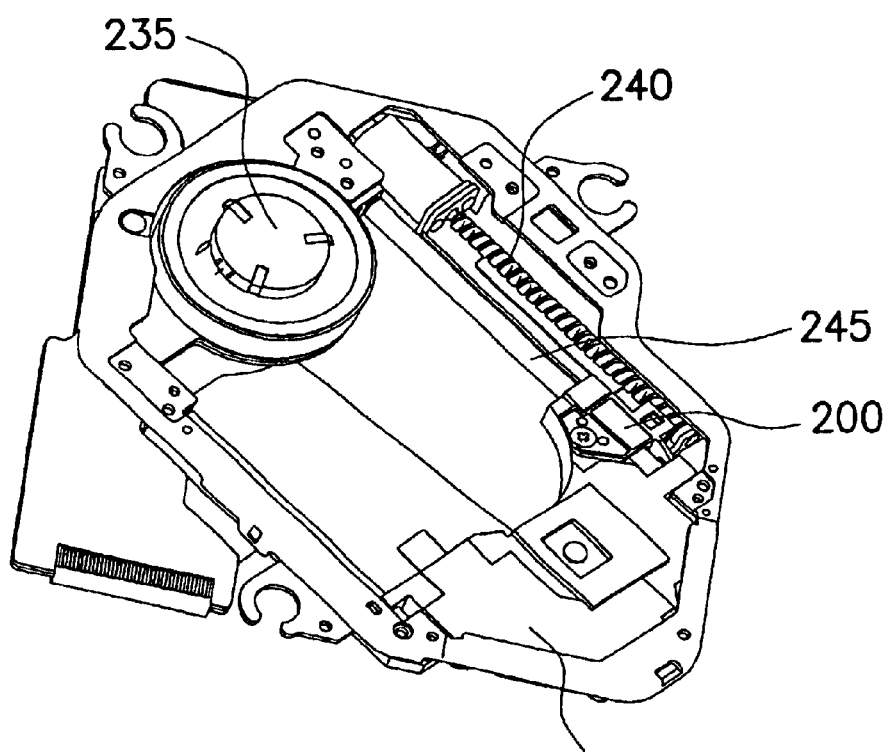

Referring to FIG. 6 through FIG. 8, various perspective views illustrate the assembly of the engaging head in a disc reading/writing head according to an embodiment of the invention. The engaging head of the invention is particularly suitable for a slim type optical disc drive usually used in portable computers. As illustrated, an optical disc drive 250 usually comprises a disc rotating spindle 235, a disc reading/writing head 230, a guiding shaft 245, and a screwed rod 240 that rotates to drive the disc reading/writing head 230 in motion.

After the pre-loading element 218 is mounted inside the accommodating space 215, which pre-loads the gear part 208 with a pre-loaded engagement pressure, the engaging head is fastened with the disc reading/writing head 230 via a screw 222 engaging through the screwed hole 220 of the attachment body 200. Subsequently, the disc reading/writing head 230 is assembled with the guiding shaft 245 in a manner that the gear teeth of the gear part 208 mesh with the screwed rod 240. It will be understood that, being pre-loaded, the gear part 208 has to be slightly pressed inward while it is mounted to the guiding shaft 245 so that it can be adequately placed adjacent to the screwed rod 240. Thereafter, the pressure is released, and the pre-loaded engagement pressure operates to adequately press the gear part 208 against the screwed rod 240.

It will be understood that the above structure for mounting the pre-loading element is not a limited example of the invention, and other constructions may be envisaged to arrange the pre-loading element in the engaging head of the invention. In a variant embodiment, the resilient pre-loading element may be directly attached to the pushing sidewall of the attachment body and the gear part by adhesion. In this case, a desired pre-loaded engagement pressure of the gear part is obtained via adequately setting the thickness of the resilient pre-loading element in accordance with the mounting space to mesh with screwed rod. When the gear part meshes with the screwed rod, the resilient pre-loading element thereby exerts an engagement pressure that adequately presses the gear part on the screwed rod.

As described above, the invention therefore includes at least the following advantages.

1. A pre-loaded engagement pressure is produced on the gear part from the resilient force exerted by a resilient pre-loading element mounted according to the invention in abutment against the pushing sidewall of the attachment body. By adequately designing the contact area between the gear part and the pre-loading element, the elasticity and thickness of the pre-loading element, and the distance separating the gear part from the pushing sidewall of the attachment body, the pre-loaded engagement pressure can be therefore accurately controlled.

2. The pre-loading element is fabricated from specific materials the characteristics and size of which preferably are easily controlled. The production yield is therefore increased.

3. Furthermore, the pre-loading element is easily mounted by insertion, which therefore facilitates the construction of the engaging head.

4. The material characteristics of the pre-loading element, made of specific materials such as silicon sponge, further provide a damping property that absorbs the vibration that may occur when the gear part engages with the rotating screwed rod.

It should be apparent to those skilled in the art that other structures that are obtained from various modifications and variations of different parts of the above-described structures of the invention would be possible without departing from the scope and spirit of the invention as illustrated herein. Therefore, the above description of embodiments and examples only illustrates specific ways of making and performing the invention that, consequently, should cover variations and modifications thereof, provided they fall within the inventive concepts as defined in the following claims.

What is claimed is:

1. An engaging head structure used in a movement converting mechanism to engage with a screwed rod, the engaging head structure comprising:

an attachment body;

a supporting extension, protruding from a pushing sidewall of the attachment body;

a gear part, connected to the supporting extension via a flexible connecting portion that allows a deflection of the gear part relative to the supporting extension, wherein the gear part has an inner surface and an opposite outer surface, the inner surface faces the pushing sidewall of the attachment body in a manner to define with the pushing sidewall and the supporting extension an accommodating space, and the outer surface has at least a gear tooth that meshes with the screwed rod; and a resilient pre-loading element, mounted inside the accommodating space in a manner to abut against the pushing sidewall and the inner surface of the gear part, the resilient pre-loading element thereby producing a pre-loaded engagement pressure causing a deflection of the gear part for engagement with the screwed rod.

2. The structure of claim 1, wherein the supporting extension further sideways forms two reinforcement flanks that are connected to the pushing sidewall of the attachment body for confine the resilient pre-loading element inside the accommodating space.

3. The structure of claim 1, wherein a cover further protrudes from the pushing sidewall of the attachment body over the accommodating space and vis-à-vis the supporting extension to confine the resilient pre-loading element inside the accommodating space.

4. The structure of claim 1, wherein the inner surface of the gear part has an abutment protrusion that abuts against the resilient pre-loading element.

5. The structure of claim 1, wherein the resilient pre-loading element is made of a material selected from a group consisting of silicon sponge, rubber, plastics, and foam sponge.

6. The structure of claim 1, wherein the engaging head structure is used in an optical disc drive in which the engaging head is fixedly attached to a disc reading/writing head to engage with the screwed rod that drives the disc reading/writing head in motion.

7. An engaging head structure used in a movement converting mechanism to engage with a screwed rod, the engaging head structure comprising:

an attachment body, having a pushing sidewall;

a gear part, wherein the gear part has an inner surface that faces and is approximately parallel to the pushing sidewall of the attachment body, and an opposite outer surface provided with at least a gear tooth that meshes with the screwed rod; and a resilient pre-loading element, mounted between the pushing sidewall of the attachment body and the inner surface of the gear part, the resilient pre-loading element being respectively connected to the pushing sidewall of the attachment body and the inner surface of the gear part, wherein a compression of the resilient pre-loading element produces a pre-loaded engagement pressure that causes a deflection of the gear part to engage with the screwed rod.

8. The structure of claim 7, wherein the gear part is directly connected to the pushing sidewall of the attachment body via the resilient pre-loading element.

9. The structure of claim 7, wherein the resilient pre-loading element is made of a material selected from a group consisting of silicon sponge, rubber, plastics, and foam sponge.

10. The structure of claim 7, wherein the engaging head structure is used in an optical disc drive in which the engaging head is fixedly attached to a disc reading/writing head to engage with the screwed rod that drives the disc reading/writing head in motion.

11. The structure of claim 7, further comprising a supporting extension projecting from the pushing sidewall of the attachment body to connect the inner surface of the gear part with the pushing sidewall of the attachment body, wherein the supporting extension, the inner surface of the gear part, and the pushing sidewall of the attachment body define an accommodating space in which is received the resilient pre-loading element.

12. The structure of claim 11, wherein a cover further protrudes from the pushing sidewall of the attachment body over the accommodating space and vis-à-vis the supporting extension to confine the resilient pre-loading element inside the accommodating space.

* * * * *